United States Patent [19]

Lipinski et al.

[11] Patent Number: 4,512,208
[45] Date of Patent: Apr. 23, 1985

[54] MECHANICAL ROTARY-TO-LINEAR MOTION CONVERSION ELEMENT

[75] Inventors: Reinhard Lipinski, Plochingen; Karl Neff, Waldenbuch, both of Fed. Rep. of Germany

[73] Assignee: PROMA Produkt-und Marketing Gesellschaft m.b.H., Plochingen, Fed. Rep. of Germany

[21] Appl. No.: 463,167

[22] Filed: Feb. 2, 1983

[30] Foreign Application Priority Data

Feb. 13, 1982 [DE] Fed. Rep. of Germany ....... 3205143

[51] Int. Cl.³ .............................................. F16H 1/18
[52] U.S. Cl. ................. 74/89.15; 74/424.8 R; 74/566
[58] Field of Search ............... 74/89.15, 424.8 R, 566, 74/499

[56] References Cited

U.S. PATENT DOCUMENTS

| | | | |
|---|---|---|---|
| 525,780 | 9/1894 | Boynton | 74/424.8 R |
| 1,495,680 | 5/1924 | Dickinson | 74/424.8 R |
| 2,270,735 | 1/1942 | Knudsen | 74/424.8 R |
| 2,413,416 | 12/1946 | Ostlund et al. | 89/1 |
| 2,640,694 | 6/1953 | Jackson | 74/89.15 X |
| 3,320,698 | 5/1967 | Hummel | 74/89.15 X |
| 3,473,404 | 10/1969 | Ross | 74/566 X |
| 3,670,583 | 6/1972 | Leming | 74/89.15 |

FOREIGN PATENT DOCUMENTS 2908805 9/1980 Fed. Rep. of Germany .

Primary Examiner—Allan D. Herrmann
Attorney, Agent, or Firm—Frishauf, Holtz, Goodman & Woodward

[57] ABSTRACT

A stiff, form-stable elongated tubular housing (1) is formed with an axially extending longitudinal slit (12). A drive spindle (4) is retained in bearings (8) located in end flanges (2) of the housing, driven for example by a motor (M). A pair of spindle nuts (5, 6) clamp, between themselves, a tubular portion (15) of a force transfer element (14) which is located externally of the housing and moved by a web (13) passing through the slit. The force transfer element is guided on the housing by interengaging groove and projection means (20, 21), which also isolate forces applied to the force transfer element from the spindle drive. The slit is closed off by a flexible web (23) which is lifted out of the slit in the region of the force transfer element by camming surfaces (33, 34) passed through a transverse opening (32) in the force transfer element, and re-seated in the slit by roller-and-pusher elements (35, 36, 37) which snap outwardly extending projections (30) of resilient web strips (28) behind the walls of the slit (12) to form a completely enclosed housing in which the spindle and spindle nuts are protected from environmental contamination, and which can retain lubricant for high-efficiency, low-noise force transmission and conversion.

18 Claims, 3 Drawing Figures

MECHANICAL ROTARY-TO-LINEAR MOTION CONVERSION ELEMENT

The present invention relates to a mechanical element which converts rotary motion, applied to a spindle, to linear motion, by sensing travel of a spindle nut on the spindle, and more particularly to the structural arrangement to permit such rotary-to-linear motion conversion to be carried out with minimum power loss, minimum noise, high efficiency, while permitting excellent reproducibility of a particular linear position in relation to a rotary position of the spindle.

BACKGROUND

Various types of linear motion elements are known, which convert external force into linear motion. Fluid-operated devices which use compressed hydraulic fluid, compressed air, or the like, usually utilize a tube, in the form of a cylinder, within which a piston is longitudinally movable. To transfer differential force applied to the fluid to linear motion with minimum space, the cylinder is usually formed with a longitudinal slit through which a force transfer element extends, coupled to a piston, or other cylindrical element which can operate within the cylinder. The slit is sealed at both sides of the force transfer element to prevent escape of the working fluid from the cylinder.

Such force-to-linear movement conversion elements require a pressure source, for hydraulic or pneumatic media, which is not always available. Precise positioning of the force transfer element with respect to a reference mark is difficult to obtain, and additional auxiliary apparatus is frequently needed, such as stops, engagement shoulders, elements or the like, if a particular predetermined position of the force transfer element with respect to the housing, for example of the cylinder, is to be obtained. Such particular positions, however, are frequently needed if the unit is to be used as a positioning element, for example to locate a particular machine tool element or a workpiece at a specific point.

Spindle drives are suitable for many applications. They are independent of pressure sources, and permit good reproducibility of positioning, with respect to input rotary power.

THE INVENTION

It is an object to provide a mechanical linear positioning element which is independent of pressure sources and which permits precise control of the position of a force transfer element with respect to a reference, for example a predetermined position of a housing, within a given stroke distance.

Briefly, a stiff, formstable, elongated, tubular housing is formed with an axially extending longitudinal slit. A spindle drive is located in the housing, preferably by bearings positioned in end covers thereof. The spindle drive has a spindle surrounded by, preferably, two spindle nuts which are threaded thereon, and between which a force transfer element is located; for only one spindle nut, the force transfer element can be directly coupled thereto. The force transfer element has an extending portion which extends through the slit, and is coupled to the output force transfer portion thereof. In accordance with a feature of the invention, cooperating guide means are coupled to the force transfer element and located on the housing, respectively, to guide the movement of the force transfer element on the housing, relative thereto upon rotation of the spindle.

Preferably, the longitudinal slit can be closed off by a flexible cover element, for example a resilient strip which has depending flanges or ridges fitting into the slit adjacent the sides of the force transfer element projecting therefrom. This arrangement permits use of ball-bearing coupling between the spindle and the spindle nut, and filling of the housing with lubricant, thus providing, in operation, for excellent transmission efficiency and low noise level.

The arrangement has the advantage that the spindle drive, together with the housing, forms one constructional unit. This constructional unit may, if desired, also include the power source, for example an electric motor, which can be flanged to the end of the housing. The unit construction, by rotation of the spindle, permits positioning of the force transfer element at any desired location within the stroke length and, additionally, permits precise positioning of the force transfer element in relation to the number or extent of revolution of the spindle drive.

The arrangement permits generation of high operating forces, while protecting the drive against environmental damage or other effects, particularly when closed off with the flexible strip at the portions where the slit is free from the operating element. This protects not only the spindle drive with respect to contamination by dirt, splashing chemicals, sand, or the like, but additionally decreases the noise, particularly when using ball bearing-like force transmission between the spindle and the spindle nut. The interior of the housing, then, can be practically sealed with respect to the outside, permitting use of high-efficiency lubricants, which additionally provides for high operating efficiency and essentially impercebtible operating noise.

Guiding the force transfer element on the housing insures that external forces which might act on the force transfer element, such as lateral forces or the like, are isolated from affecting the spindle, so that the spindle nut, or the spindle nut, is not subjected to transverse or longitudinal unbalanced forces tending to distort the precise axial alignment of the spindle between the bearings at the ends thereof. Isolation of forces applied to the force transfer element from the spindle itself substantially improves the operating reliability since wear on the spindle or spindle nut due to external twisting forces is excluded.

In a preferred form of the invention, the housing is a tubular element which has a specific profile, closed off, preferably, by bearing flanges which retain the bearings for the spindle.

DRAWINGS

DETAILED DESCRIPTION

Figure 2:
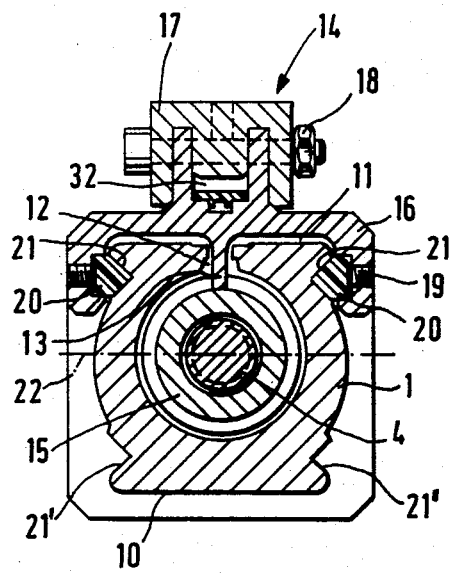
FIG. 2 is a section along line II—II.

An elongated housing 1, which is a tubular, profile-shaped element—see FIG. 2—is closed off at its end by two flanges 2, secured by screws 3 to the housing 1. A spindle drive is located within the housing 1, which is formed by a central spindle 4 and two spindle nuts 5, 6. The spindle, which can have threads in the form of ball runner grooves, is journalled at its two axial ends in low-friction ball bearings 8. The spindle itself has cylindrical end portions 7, fitting into the inner races of the bearings 8, and secured within the end flanges 2. At least one of the cylindrical end portions 7 extends beyond the end face of the associated bearing flange 2. At least this one spindle end portion is adapted and arranged to be coupled to an electric motor—only schematically shown in the drawing—for example by shaping the end portion in square or hexagonal configuration, or by a coupling, for example using a set screw or the like.

The outer side of the housing 1 is formed with two parallel plane surfaces 10, 11—see FIG. 2. One of these surfaces, in the illustration the surface 11, is formed with a longitudinal slit 12. A web-like portion 13 of a force transfer element 14 extends through the slit 12 from the interior of the housing to the outside thereof. The web-shaped portion or part 13 merges into a cylindrical element 15, formed or shaped like an eyelet, and surrounding the spindle 4. The cylindrical portion 15 is axially clamped between the two spindle nuts 5, 6. This provides for force transfer coupling of the web 13 and the element 15 with the spindle nuts in either direction, and, further, clamps the spindle nuts with respect to each other and provides for relative, respective secure seating thereof.

A guide yoke 16 is secured to the web-shaped element 13 outside of the housing 1. The guide yoke 16 is connected to a coupling member 17 by a screw 18, shown only in FIG. 2 and omitted from FIG. 1 for clarity in the drawing. The guide yoke 16 surrounds the outer surface of the housing 1 and has two inwardly directed guide strips 20 secured thereto. The respective positions of the guide strips 20 can be adjusted by screws 19. The guide strips 20 are arranged parallel to each other, and are guided in matching parallel grooves 21, located on both sides of the longitudinal slit 12 and at the outer sides of the housing 1—see FIG. 2. The grooves 21 and the strip elements 20, together, form cooperating guide elements coupled, on the one hand, to the force transfer element 16 and, on the other, to the housing, to guide the force transfer element 16, and hence the web portion 13 on the housing while absorbing any external forces which might be applied to the force transfer element 16 and thus prevent their transmission through the web element 13 on the eyelet structure 15.

The force transfer element 14 which, upon rotation of the spindle 4 is moved by the spindle nuts 5, 6 in axial direction, thus is longitudinally guided by the tracks 21 on the housing 1 and is laterally supported thereon. Thus, the force transfer element 14 as well as the spindle nuts 5, 6 are held securely and non-rotatably, and further are so guided that transversely directed forces cannot be transferred to the spindle drive formed by the spindle 4 and the spindle nuts running thereon.

A pair of additional guide tracks 21' are located on the housing 1, as best seen in FIG. 2. The additional guide tracks 21' are symmetrically located on the housing 1 with respect to an axis of symmetry 22. The additional guide tracks 21' are located with respect to the axis or plane of symmetry 22 which is remote from the guide tracks 21. The transfer element 14 can be so constructed that the lateral dependent legs carrying the guide strips 20 engage the guide surfaces 21' to guide the transfer element 14 only from the lower guide surfaces 21'. If the depending legs of the element 16 are extended and the force transfer element 14 is guided only from the lower guide surfaces 21', which increases the longitudinal stability of guidance since the engagement surfaces of the yoke 16 are farther removed from the longitudinal slit 12.

Figure 3:
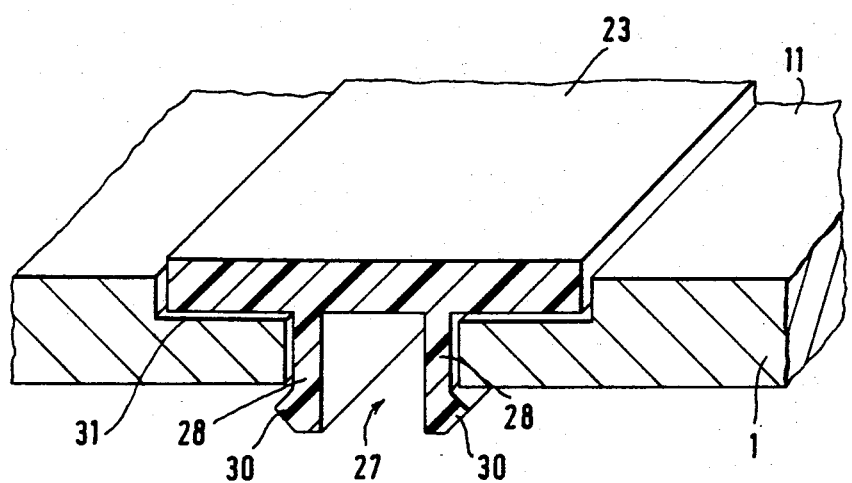
FIG. 3 is a perspective view showing a fragment of the housing and a cover strip arrangement, to an enlarged scale.

The element can operate under adverse environmental conditions and, further, includes means to retain fluids, such as lubricant, therein. Referring to FIG. 3: The longitudinal slit 12 is closed off at both sides of the force transfer element 14 by a resilient, deflectable closing strip, formed as a flexible tape, typically made of plastic. This tape 23 has longitudinal depending flanges 28, with projecting tips 30 which snap behind the portion of the housing adjacent the slit 12. The strip 23 is secured at its end portions 24, 25 (FIG. 1) on the bearing flanges 2, and thus secured to the housing 1. In cross section, the strip or tape 23 is approximately rectangular (see FIG. 3). The holding portion generally shown at 27 is formed by the two depending strips 28. The strips 28 are located to fit within the slit 12 and the projections or noses 30 are, preferably, formed as a unitary, molded projection extending laterally from the strip 28. The strips 28 are resiliently deflectable inwardly. The projections 30 are spaced from the top portion of the strip 23 by the thickness of the housing portion 1 adjacent thereto, so that they fit snugly thereunder, while permitting resilient deflection. The engaging projections 30, in cross section, are approximately, and fit behind the inner edges of the slit 12—see FIG. 3. The upper portion of the housing 1 is formed with a recess 31 into which the strip 23 can fit, either flush, or with only slight projection, as shown.

Figure 1:
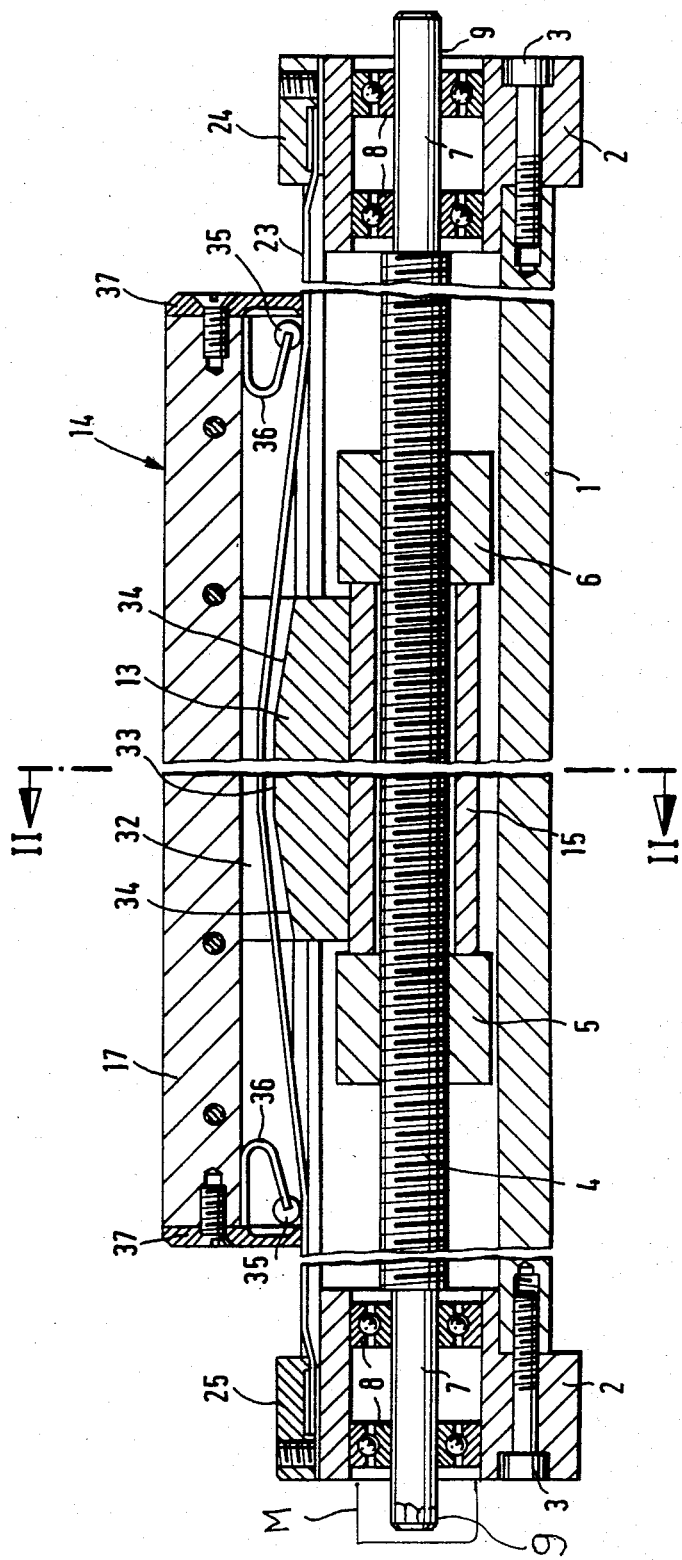
FIG. 1 is a longitudinal sectional view through the rotary-to-linear motion conversion element.

The force transfer element 14 is formed with a longitudinal opening 32—see FIG. 1—above the web element 13 and the guide yoke portion 16. The opening 32 extends in the form of a channel or duct. The lower surface of the channel or duct tapers downwardly—see FIG. 1—from a central raised portion to two camming or lifting surfaces 34.

The force transfer element 14, and axially spaced from the central portion 33, is formed at the end with two holding fingers 37 which, for example, may be made of deflectable low-slip material, engaging the upper surface of the strip or tape 23, to hold the strip 23 downwardly and in secure engagement with the longitudinal strips 28 in the slit 12. Additionally, hold-down and compression rollers 35 are supported on spring clips 36, secured to the force transfer element 14, and rolling off against the web 23. Rollers 35 are located just inwardly of the hold-down strips 37. Strips 37, preferably, are removable and secured to the element 14 by screws, as shown. FIG. 11 illustrates the force transfer element somewhat axially foreshortened. The housing 1 is shown broken at both sides of the force transfer element 14.

Operation: Upon rotation of the spindle 4, for example by the motor M, the force transfer element 14 is shifted axially. The tape 23 is lifted off from engagement in the slit 12 by engagement of the inclined portions 34 of the camming surface 33, permitting resilient deflection of the holding strips 28. At the trailing side, the slit 12 is again closed, rollers 35 pressing the strip 23 into the slit 12, to provide for snap-in engagement of the projections 30 behind the inner wall of the housing adjacent the slit. Thus, the slit is securely closed off at both sides of the force transfer element which, in turn, is closed off with respect to the top of the strip 23 by the closing element 37.

The flexible cover strip 23 is engaged on the camming surface 33 which projects over the circumference of the housing in the region of the longitudinal slit 12 in radial direction, so that the cover strip 23 can be lifted off the slit 12 upon movement of the element 14, the holding strips 28 deflecting inwardly to permit the projections 30 to snap out of the slit. Lifting of the strip 23 permits passage of the web-like portion 13 of the force transfer element through the slit 12. The rollers 35, in cooperation with the fixed hold-down end strips 37, insure that the strip 23 is securely seated again in the recess 31 of the housing, and that the lateral projections 30 snap into the slit 12 to elastically hold the strip 23 engaged against the top wall of the housing.

Various changes and modifications may be made. In the embodiment shown, housing 1 is formed with only one longitudinal slit. It is also possible to so shape the housing that it has a plurality of longitudinal slits through which portions of the force transfer element, or of several force transfer elements, extend outwardly, each one of the slits being closed off by a closing strip 23. The resulting housing portions are held in respective alignment by the end flanges 2.

The hold-down fingers 37 may have the width of the housing 1, and glide along the flat surface 11, if necessary suitably shaped to receive the strip 23. Sliding engagement of the strips 37 with the top surface 11 has the additional advantage that entry of contaminants, corrosive liquids, sand, and the like, into the interior of the force transfer element 34 is prevented. Thus, possible contamination of the interior of the housing, by migration of such contaminants through the slit 12 beneath the force transfer element 14, where the slit is uncovered, is likewise prevented.

Housing 1 can be filled, at least in part, with lubricating oil. This insures essentially wear-free operation of the spindle drive and additionally decreases operating noise. The bearings 8, then, should be oil-leakproof bearings, utilizing any well known and suitable construction to prevent escape of liquid lubricant from the interior of the housing 1 through the bearings 8, for example by sealing rings, labyrinth constructions, or the like, or combinations thereof.

Use of the web 23 is particularly desirable if the force transmission or conversion element is utilized in surroundings where it is exposed to splashing or spraying water, mudd, corrosive liquids, or the like; additionally, the construction permits universal placement of the unit, that is, in any desired arrangement or direction with respect to the horizontal. It prevents the escape of lubricant even under otherwise undesirable positions of the unit, and thus is used in accordance with a preferred embodiment of the invention.

Use of the rollers 35 in combination with the end strips 37 decreases wear on the upper surface of strip 23, and additionally improves the operating efficiency of the unit by decreasing frictional forces from element 37 against the strip 23. The rollers 35 are not strictly necessary. They do contribute, however, to reliable seating, lower operating noise, and improved force transfer efficiency. The recess 31 in the top surface 11 of the housing, in which the strip 23 fits, additionally improves the sealing effect obtained by the strip 23 and results in smooth outer appearance of the housing in the portion remote from the then existing position of the force transfer element 14.

The depending web or strip portions 28 from the strip 23 increase the resistance of the strip 23 to twisting in addition to providing for reliable seating of the strip 23 in the slit 12.

The force transfer element 14 or, rather, the eye portion 15 thereof, and the spindle nuts 5, 6 can be formed as one unitary structure, or they can be separately made and secured together. Engagement of the spindle nuts 5, 6 against the eye element 15, once made, will securely clamp the element 15, and hence the force transfer element 14 between the spindle nuts 5, 6; it is not necessary to, additionally, connect the spindle nuts 5, 6 to the eye portion 15, although this can be done, for example by axially extending screws parallel to the spindle 4. A unitary construction of the force transfer element 14 with the spindle drive is particularly suitable if only a single spindle nut is used, positioned, for example, beneath the web portion 13.

Various other changes and modifications may be made within the scope of the inventive concept.

We claim:

1. Mechanical rotary-to-linear motion conversion element, to provide linear movement of an output element (17) comprising
    a stiff, form-stable elongated tubular housing (1) formed with an axially extending longitudinally slit (12);
    a spindle drive located in the housing having
    a drive spindle (4) axially located in the housing;
    bearing means (8) located in the end portions of the tubular housing, and rotatably retaining the spindle therein;
    and at least one spindle nut (5, 6) threaded on the drive spindle;
    a force transfer element (14) coupled to the at least one spindle nut, extending through the slit (12) and coupled to the output element (17);
    cooperating, relatively movable guide means (20, 21) having a first portion (20) coupled to the force transfer element, and a second portion (21) located on the housing, said portions being in mutual, relatively movable engagement with each other, for guiding movement of the force transfer element on the housing upon rotation of the spindle and isolating external forces applied to the force transfer element from the spindle (4);
    an elongated, flexible closing strip (23) closing off the slit (12) in the regions between the end portions of the housing (1) and said force transfer element;
    wherein said flexible strip (23) is secured to the housing at the end portions thereof;
    and said strip includes a holding flange or strip (27) extending transversely to the width of the strip and dimensioned to fit into the slit (12);
    and wherein the force transfer element (14) includes a projecting element (13) projecting through the slit and coupled to the at least one spindle nut;
    means (33, 34) lifting the strip (23) out of the slit at both longitudinal sides of said projecting element;
    and means (35, 36, 37) located at the respective end portions of the force transfer element and opposite said slit engaging the strip (23) and applying a force thereto to seat the strip against the slit.

2. Element according to claim 1, wherein the housing (1) comprising a structural shaped tube having an at least approximately rectangular outer circumference.

3. Element according to claim 1, including terminal bearing flanges (2) closing off both end portions of the housing, the bearing means (8) being located within said flanges (2) and rotatably retaining said spindle (4) therein.

4. Element according to claim 1, wherein said means for lifting the strip out of the slit comprises
   a camming surface (33, 34) formed on said projecting element (13) and engaging a portion of the strip.

5. Element according to claim 1, wherein the means engaging the strip and applying a force thereto for reseating the strip comprises
   at least one hold-down element (35, 37) pressing against the outer side—with respect to the slit—of the strip (23).

6. Element according to claim 5, wherein the at least one hold-down element includes at least one resiliently supported roller (35).

7. Element according to claim 5, wherein the at least one hold-down element includes a closing finger or strip (37) fitting at least across the top surface of the strip.

8. Element according to claim 1, wherein the projecting element (13) is formed with an opening extending transversely to said slit (12) and dimensioned to receive the strip (23);
   and wherein the means for lifting the strip comprises camming surfaces (33, 34) defining one surface of said opening.

9. Element according to claim 1, wherein the transversely extending flange (27) comprises a web structure having laterally projecting engagement projections (30) fitting beneath the wall of the housing (1) adjacent the slit (12) to engage around the slit and form resiliently deflectable holding ridges.

10. Element according to claim 9, wherein said web structure comprises a pair of parallel projecting rails (28) located immediately adjacent the edge of the slit (12) and being formed, as a unitary structure, with said holding ridges.

11. Element according to claim 1, wherein said second portion of the guide means (21) comprises a pair of parallel guide tracks located, respectively, at opposite sides of the slit (12);
and the first portion includes a yoke element (16) spanning said slit and supporting the first portion (20) of said guide means, for engagement with said tracks (21).

12. Element according to claim 11, wherein said guide tracks include recessed guide surfaces (21, 21') formed, groove-like, in the outer circumference of the housing.

13. Element according to claim 1, wherein a pair of groove-like guide surfaces (21') are located in a plane remote from a plane of symmetry (22) passing through the axis of rotation of the spindle (4) and opposite the slit (12).

14. Element according to claim 1, wherein two spindle nuts (5, 6) are provided;
   and the force transfer element includes a hollow structure (15) surrounding the spindle and clamped between the two spindle nuts (5, 6).

15. Element according to claim 1, further comprising a drive motor (M) coupled (9) to the spindle (4), to form a unitary assembly therewith and provide linear output from said force transfer element (14) upon rotation of the motor.

16. Element according to claim 15, further including an elongated, flexible closing strip (23) closing off the slit (12) in the regions between the end portions of the housing (1) and said force transfer element.

17. Element according to claim 1, wherein the force transfer element (14) includes a yoke structure (16) spanning across the elongated tubular housing;
   and the guide means include
      interengaging projection-and-recess means (20, 21) formed on said yoke and on the housing, respectively, and located symmetrically with respect to the slit (12).

18. Element according to claim 17, further including an elongated, flexible closing strip (23) closing off the slit (12) in the regions between the end portions of the housing (1) and said force transfer element.

* * * * *